Figure 8:
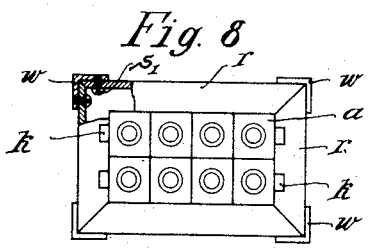
Figure 8A:
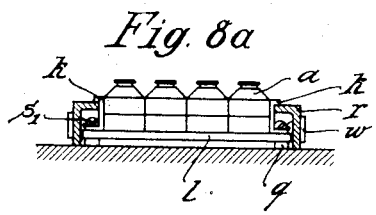

W. KLEMENT.
PANEL BOARD.
APPLICATION FILED JAN. 3, 1912.
1,196,788.
Patented Sept. 5, 1916.
3 SHEETS—SHEET 1.
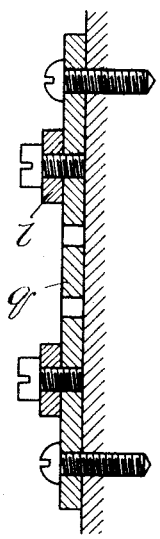
Fig. 1ᵃ
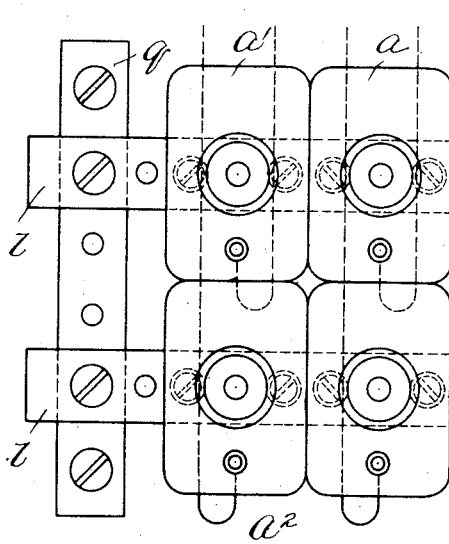
Fig. 1.
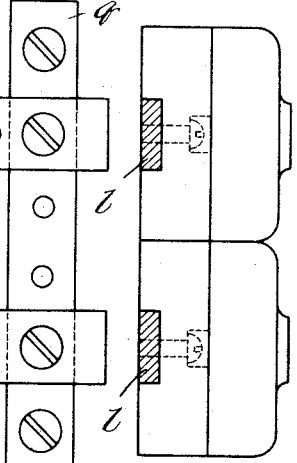
Fig. 1ᵇ
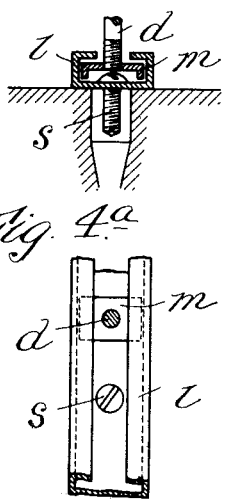
Fig. 4.
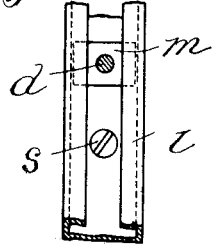
Fig. 4ᵃ
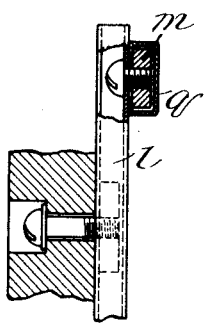
Fig. 11.
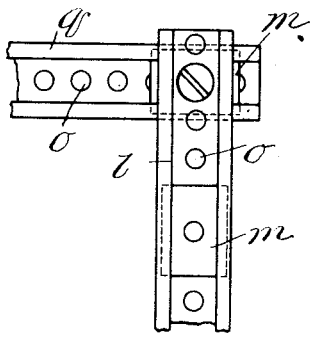
Fig. 11ᵃ
Witnesses:
Marguerite Schaup
Octavius Knight
Inventor:
Wilhelm Klement
By King,
his Attorney W. KLEMENT.
PANEL BOARD.
APPLICATION FILED JAN. 3, 1912.
1,196,788.
Patented Sept. 5, 1916.
3 SHEETS—SHEET 2.
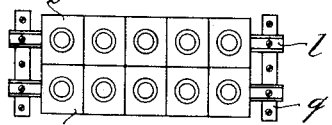
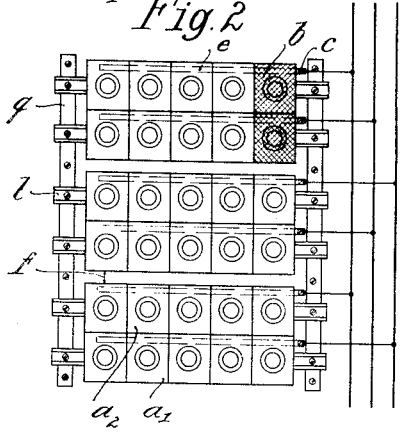
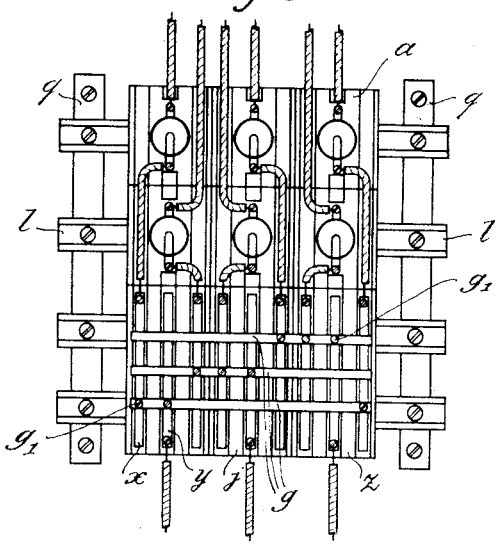
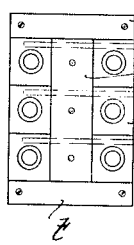
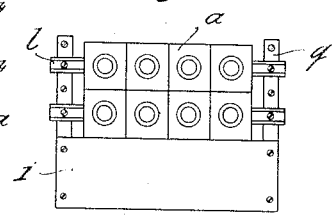
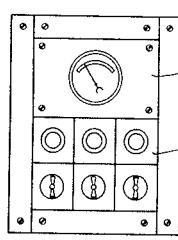
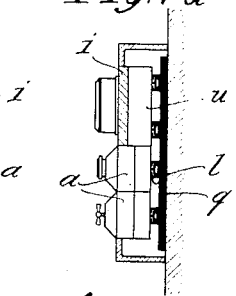
Witnesses
H. H. Knight
E. M. Fenster
Inventor
Wilhelm Klement
By his attorneys
Kruger Bros

UNITED STATES PATENT OFFICE.

WILHELM KLEMENT, OF NEU-FINKENKRUG-FALKENHAIN, NEAR SPANDAU, GERMANY, ASSIGNOR TO SIEMENS-SCHUCKERT WERKE, G. M. B. H., OF BERLIN, GERMANY, A CORPORATION OF GERMANY.

PANEL-BOARD.

1,196,788.      Specification of Letters Patent.      Patented Sept. 5, 1916.

Application filed January 3, 1912. Serial No. 669,213.

*To all whom it may concern:*

Be it known that I, WILHELM KLEMENT, a subject of the German Emperor, and residing at Neu-Finkenkrug-Falkenhain, near Spandau, Germany, have invented certain new and useful Improvements in Panel-Boards, of which the following is a specification.

My invention relates to panel boards for electric systems, and substantially consists in arranging the individual units of the group on bars, and not on a fixed board, the said bars being connected together by cross-bars.

The purpose of the panel boards is, in general, to centralize at one place the safety switches or similar members of the various circuits. Heretofore the panel boards were made by mounting the individual units in the workshop on fixed boards and erecting these boards carrying the units at the place in question. Now my invention enables the individual parts of the panel boards to be taken separately to the place of erection and readily mounted there. My invention also enables panel boards of any desired size to be assembled with the same means. Likewise, it is possible at any time to enlarge to any desired extent the panel boards made according to my invention when this is rendered necessary owing to the enlargement of the plant. I have designed for the new panel boards specially suitable forms of apparatus which will be described hereinafter.

Several illustrative embodiments of my invention are represented by way of example in the accompanying drawing, wherein:—

Figure 1 shows in front elevation a simple group of units; Fig. 1$^a$ is a vertical section thereof through the middle of one of the vertical bars; Fig. 1$^b$ is a similar view taken on a line between one of the vertical bars and the units; Fig. 2 a composite group of fuses, and Fig. 3 shows a group of fuses in combination with special auxiliary sets of bars for connecting the supply main as desired with the distributing mains; Figs. 4 and 4$^a$ show in vertical section and top plan view, respectively, one practical form of the bar and its attachment nut; Fig. 5 shows the arrangement of blank boards between the individual sets of units, and Fig. 6 the combination of a group of fuses with an instrument board; Figs. 7 and 7$^a$ show in elevation and vertical section, respectively, one arrangement of the instrument board on special foundations, Figs. 8 and 8$^a$ are like views showing a simple group of fuses surrounded by a frame, Figs. 9 and 9$^a$ are like views showing one practical form of the units and the arrangement of the universal bars and distributing mains, and Figs. 10 and 10$^a$ are front elevation, and side elevation partly in section, respectively, showing one single safety member particularly adapted for making the new panel boards. Fig. 11 is a vertical section showing the mounting of the U-bars and slide nuts shown in Figs. 4 and 4$^a$; Fig. 11$^a$ is a front elevation of the same.

Referring to the drawing, Fig. 1 shows the simplest arrangement of a group of units according to my invention. The individual units $a$ are mounted on bars $l$ which are connected by cross-bars $q$. These cross-bars are attached to the wall or to a frame or scaffold and thus carry the entire group; if desired, they may form the supporting framework themselves. If there is a large number of units it is preferable to arrange directly beside one another the corresponding units $a_1$, $a_2$ of different polarity which are on different bars, and to arrange groups of such corresponding units apart from one another. Fig. 2 shows groups of fuses arranged in this manner. The corresponding fuses $a_1$, $a_2$ of different polarity on different bars are arranged directly one beside another, while such groups of corresponding units are separated from one another by the gaps $f$ in order to increase the clearness of the arrangement, because the units corresponding to one main can then be at once recognized in the panel board.

The individual installation units may be attached to the bars by screws engaging in holes preliminarily bored in the bars. In order to enable any desired arrangement when assembling the units, it is preferable to make the holes as close together as possible. The longitudinal bars may be attached in like manner on the cross-bars. Under certain circumstances it may, however, be desirable to be able to attach both the individual units on the longitudinal bars and also these bars on the cross-bars at any desired place. To this end, it is preferable to make the bars channeled, as shown in Figs. 4 and 4ª. The bar $l$ contains the nut $m$ in which the screw $d$ of the unit engages. The bar itself is fastened to the wall by means of the screw $s$. In order to prevent the nut $m$ falling to the bottom of the channeled bar during erection, and in order to move it readily over the heads of the screws $s$ it is preferable to make the nuts U-shaped or with lateral guide shoulders, as clearly shown in Fig. 4.

Figs. 11 and 11ª show how the U-bars are connected together and the units are secured to their bars. In the hollow spaces of the bars, nuts $m$ are slidably positioned and in these nuts are secured the fastening screws of the other part. Furthermore, a closely spaced series of perforations $o$ are formed in the bars, by which the bars may be secured to the wall.

As shown in Fig. 2, for connecting the individual units to the mains, electrically conducting connections $e$ having connectors $c$ may be provided in each row. If it is wished, however, to arrange that the connection of the individual mains can be changed as desired at any time, as Fig. 3 shows auxiliary sets of bars $j$ will preferably be employed. These sets of bars carry electrically conducting bars $x$ for the connection of the individual distributing mains and electrically conducting bars $y$ parallel therewith for the connection of the supply mains. At right angles to these bars $x$ and $y$ are the transverse connecting bars $g$ which can be connected with the bars $x$ and $y$ in any desired manner by special distributing screws. The individual auxiliary sets of bars are covered by separate lids.

Under certain circumstances it may happen that all the divisions or squares of one panel board are not occupied by units, because there are no more mains. Now in order to give the appearance of a closed group the empty divisions may be filled, as indicated in Fig. 2, by blanks $b$ corresponding exactly in form and appearance to the used units $a$. This arrangement has the additional advantage that should the plant be subsequently extended useful units can take the place of the blanks.

In a plant in which provision must be made for subsequent extension a larger space may be provided from the first and be covered over by separate blank boards $t$, as represented in Fig. 5. Such blank boards may also be employed in order to cover over the connections of the various elements or members in the spaces between the various rows.

Fig. 6 shows a group of units comprising, in addition, a board $i$ for other apparatus, such as measuring instruments, meters, switches and the like. In general, when this board is arranged directly on the cross-bars it is lower than the front of the units. This position is frequently not desirable and necessitates special measures being taken when the group is to be provided with a frame. In this event, as shown in Fig. 7ª, a backboard or base $u$ may be arranged between the board $i$ and the cross-bars $q$. By means of similar bases the units themselves can be arranged at any desired elevation above the cross-bars, as is frequently desirable owing to the mode in which the connecting cables have to be disposed.

In order to close the group laterally it is preferable, as mentioned above, to provide the same with a frame. Such a frame is shown arranged around the groups shown in Figs. 7, 7ª, and 8, 8ª. The frame is preferably made of angular strips $r$ (Fig. 8) beveled or mitered at their ends. The individual strips may be held together by corner pieces $w$ by screws $s'$. It is preferable to arrange the screws, as shown in Fig. 8, so that they are inaccessible from the outside. Fig. 8ª shows a practical attachment device for the frame. The frame is held by clamps $k$ attached to the bars. The clamps can be bent back only after removing an apparatus or a cover of a unit, whereupon the frame can be removed. This mode of attachment affords a certain security that unauthorized persons cannot touch live parts of the group by removing the frame.

Figure 9:
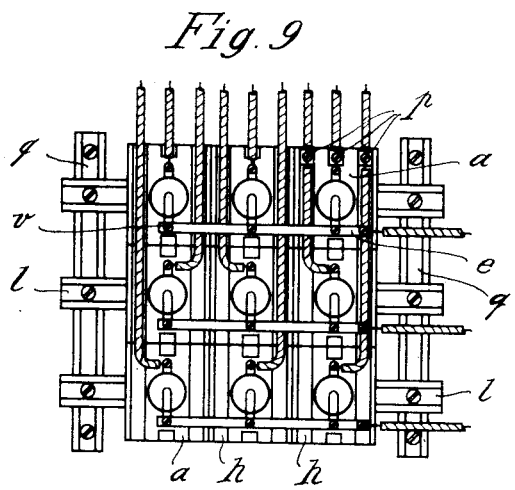
Figure 9A:
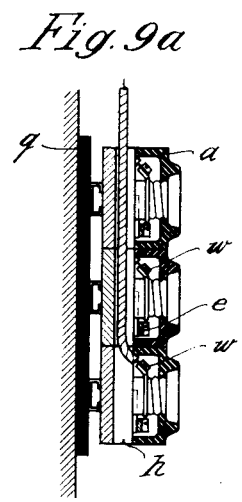
Figure 10:
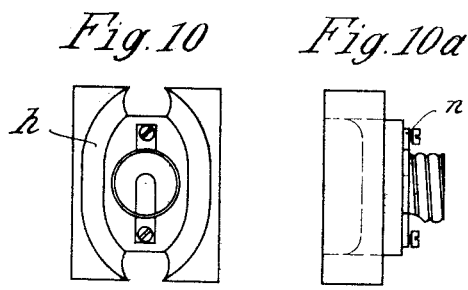
Figure 10A:
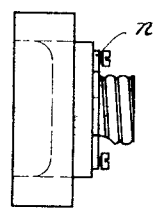

Figs. 9 and 9ª show another form of the units particularly adapted to be used in the panel board according to my invention. The units, e. g. the fuse blocks $a$, have lateral grooves $h$ for the distributing mains. The bus-bars $e$ are arranged transversely of these grooves. The grooves are so deep that the distributing mains will not contact with the bus-bars. If it is wished to conduct the distributing mains away in insulating tubes it is preferable for the grooves $h$ to run together at the ends of the units. Such a safety device is represented in Fig. 10. In order certainly to prevent the distributing mains contacting with the bus-bars, as shown in Fig. 10ª the top faces $n$ of the bus-bars may be specially raised. If it is not wished to conduct the distributing mains up to the individual units, connecting terminals may be arranged at the ends of the upper units. Such connecting terminals $p$ are shown in Fig. 9 at the upper fuse $a$ on the right-hand of the group.

The bus-bars $e$ shown in Fig. 9 are made in practice so that they have incisions or notches $v$ at certain intervals into which the terminal screws of the units engage. The connecting terminals $w$ for the distributing mains may be arranged, as shown in Fig. 9, slantwise relatively to the bases. This arrangement enables the mains to be connected in a simple manner without their being severely bent.

I claim:—

1. A panel board comprising in combination a plurality of units and a frame for supporting said units in desired groups of rows, comprising suitably connected longitudinal bars and cross bars, said bars being channeled throughout their entire length and provided with perforations and slide nuts, slidable within the channels of said bars for adjustably securing said units to said bars and the bars to each other.

2. A panel board comprising in combination a plurality of units and a frame for supporting said units in desired groups of rows, comprising suitably connected longitudinal bars and cross bars, said bars being channeled throughout their entire length and provided with perforations and slide nuts, slidable within the channels of said bars for adjustably securing said units to said bars and the bars to each other, said nuts being U-shaped.

3. A panel board comprising in combination a plurality of units and a frame for supporting said units in desired groups of rows, comprising suitably connected longitudinal bars and cross bars, said bars provided with perforations, and an inclosing casing, said bars being provided with clamps securing said casing to the bars, said clamps allowing the casing to be removed only when one or more of the units has been partially or wholly removed from the bar and the clamps have been bent back.

In testimony whereof, I have signed my name to this specification in the presence of two witnesses.

WILHELM KLEMENT.

Witnesses:
HENRY HASPER,
WOLDEMAR HAUPT.

Copies of this patent may be obtained for five cents each, by addressing the "Commissioner of Patents. Washington, D. C."